(12) United States Patent
Cohen

(10) Patent No.: US 6,177,495 B1
(45) Date of Patent: Jan. 23, 2001

(54) SILICA-FILLED DIENE-BASED RUBBERS CONTAINING TIN ORGANOACID SALT COMPOUNDS

(75) Inventor: Martin Paul Cohen, Fairlawn, OH (US)

(73) Assignee: The Goodyear Tire & Rubber Company, Akron, OH (US)

( * ) Notice: Under 35 U.S.C. 154(b), the term of this patent shall be extended for 0 days.

(21) Appl. No.: 09/256,552

(22) Filed: Feb. 24, 1999

(51) Int. Cl.$^7$ .......................................................... C08L 5/24
(52) U.S. Cl. ............................................. 524/262; 524/399
(58) Field of Search ..................................... 524/262, 399

(56) References Cited

U.S. PATENT DOCUMENTS 5,130,363 * 7/1992 Scholl et al. ........................... 524/392

* cited by examiner

Primary Examiner—Peter D. Mulcahy

(74) Attorney, Agent, or Firm—Bruce J Hendricks

(57) ABSTRACT

The present invention relates to a composition and a method of processing a composition containing from 0.1 to 10 phr of a tin organoacid salt selected from the group consisting of compounds of the formula

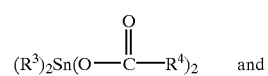

(II)

and

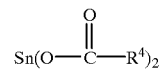

(III)

where $R^3$ and $R^4$ are independently selected from the group consisting of alkyls having from 1 to 20 carbon atoms, alkenyls having from 1 to 20 carbon atoms and aryls and alkaryls having from 6 to 20 carbon atoms.

26 Claims, No Drawings

SILICA-FILLED DIENE-BASED RUBBERS CONTAINING TIN ORGANOACID SALT COMPOUNDS

FIELD OF THE INVENTION

The present invention relates to a rubber composition which is useful in articles such as tires and the processing of such rubber compositions.

BACKGROUND OF THE INVENTION

Highly silica-loaded rubber compositions have excellent performance characteristics for use as tire treads but suffer deficiencies in need for high levels of coupling agents as well as extended mixing, both of which are costly to production. Therefore, there exists a need to achieve the desirable performance characteristics without the downside of high materials and processing costs.

SUMMARY OF THE INVENTION

The present invention relates to a composition and a method of processing a silica-filled rubber containing a sulfur containing organosilane and a tin organoacid salt compound.

DETAILED DESCRIPTION OF THE INVENTION

There is disclosed a rubber composition comprising (a) 100 parts by weight of an elastomer containing olefinic unsaturation selected from the group consisting of conjugated diene homopolymers and copolymers and from copolymers of at least one conjugated diene and aromatic vinyl compound;

(b) from 10 to 150 phr of a silica;

(c) from 0.1 to 15 phr of a sulfur containing organosilicon compound of the formula Z-Alk-S$_n$-Alk-Z in which Z is selected from the group consisting of

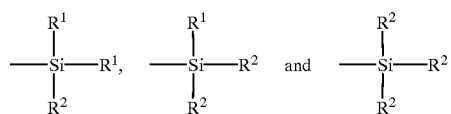

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8; and (d) from 0.1 to 10 phr of a tin organoacid salt selected from the group consisting of compounds of the formula (II)

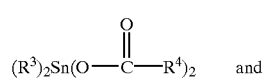
and (III)

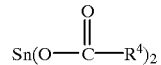

where $R^3$ and $R^4$ are independently selected from the group consisting of alkyls having from 1 to 20 carbon atoms, alkenyls having from 1 to 20 carbon atoms and aryls and alkaryls having from 6 to 20 carbon atoms.

In addition, there disclosed a method for processing a rubber composition comprising mixing (a) 100 parts by weight of an elastomer containing olefinic unsaturation selected from the group consisting of conjugated diene homopolymers and copolymers and from copolymers of at least one conjugated diene and aromatic vinyl compound;

(b) from 10 to 150 phr of a silica;

(c) from 0.1 to 15 phr of a sulfur containing organosilicon compound of the formula Z-Alk-S$_n$-Alk-Z in which Z is selected from the group consisting of

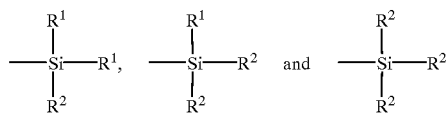

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8; and (d) from 0.1 to 10 phr of a tin organoacid salt selected from the group consisting of compounds of the formula (II)

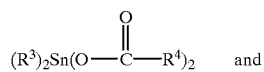
and (III)

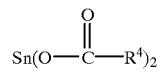

where $R^3$ and $R^4$ are independently selected from the group consisting of alkyls having from 1 to 20 carbon atoms, alkenyls having from 1 to 20 carbon atoms and aryls and alkaryls having from 6 to 20 carbon atoms.

The present invention may be used to process rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, styrene/isoprene/butadiene rubber, isoprene-butadiene copolymer, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, isoprene-butadiene copolymer, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition should contain a sufficient amount of silica filler to contribute a reasonably high modulus and high resistance to tear. The silica filler may be added in amounts ranging from 10 to 150 phr. Preferably, the silica filler is present in an amount ranging from 15 to 100 phr. If carbon black is also present, the amount of carbon black, if used, may vary. Generally speaking, the amount of carbon black will vary from 0 to 80 phr. Preferably, the amount of carbon black will range from 0 to 40 phr. It is to be appreciated that the sulfur containing organosilane described hereafter may be used in conjunction with a carbon black, namely pre-mixed with a carbon black prior to addition to the rubber composition, and such carbon black is to be included in the aforesaid amount of carbon black for the rubber composition formulation.

The commonly employed siliceous pigments used in rubber compounding applications can be used as the silica in this invention, including pyrogenic and precipitated siliceous pigments (silica) and aluminosilicates, although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

Further, the silica, as well as the aforesaid alumina and aluminosilicate may be expected to have a CTAB surface area in a range of about 100 to about 220. The CTAB surface area is the external surface area as evaluated by cetyl trimethylammonium bromide with a pH of 9. The method is described in ASTM D 3849 for set up and evaluation. The CTAB surface area is a well known means for characterization of silica.

Mercury surface area/porosity is the specific surface area determined by Mercury porosimetry. For such technique, mercury is penetrated into the pores of the sample after a thermal treatment to remove volatiles. Set-up conditions may be suitably described as using a 100 mg sample; removing volatiles during 2 hours at 105° C. and ambient atmospheric pressure; ambient to 2000 bars pressure measuring range. Such evaluation may be performed according to the method described in Winslow, Shapiro in ASTM bulletin, p.39 (1959) or according to DIN 66133. For such an evaluation, a CARLO-ERBA Porosimeter 2000 might be used.

The average mercury porosity specific surface area for the silica should be in a range of about 100 to 300 m²/g.

A suitable pore-size distribution for the silica, according to such mercury porosity evaluation, is considered herein to be five percent or less of its pores have a diameter of less than about 10 nm; 60 to 90 percent of its pores have a diameter of about 10 to about 100 nm; 10 to 30 percent of its pores have a diameter of about 100 to about 1000 nm; and 5 to 20 percent of its pores have a diameter of greater than about 1000 nm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhodia Inc, with, for example, designations of Z1165MP and Z165GR and silicas available from Degussa AG with, for example, designations VN2, VN3, BV3380GR, etc, and silicas available from Huber, for example Huber Sil 8745.

The next critical component of the composition of the present invention is a sulfur containing organosilicon compound. Examples of suitable sulfur containing organosilicon compounds are of the formula:

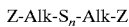

in which Z is selected from the group consisting of

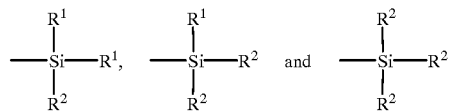

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) tetrasulfide and 3,3'-bis(triethoxysilylpropyl) disulfide. Preferably Z is

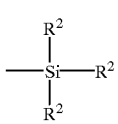

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 4.

The amount of the above sulfur containing organosilicon compound in a rubber composition will vary depending on the level of silica that is used. Generally speaking, the amount of the compound of Formula I will range from 0.1 to 15 phr. The preferred level of sulfur containing organosilicon compound ranges from 1.0 to 10 phr. In accordance with one embodiment of the invention, the amount of the compound of Formula I will range from 0.03 to 0.2 parts by weight per part by weight of the silica. Preferably, the amount will range from 0.05 to 0.15 parts by weight per part by weight of the silica.

The tin organoacid salt compounds for use in the present invention are of the formula:

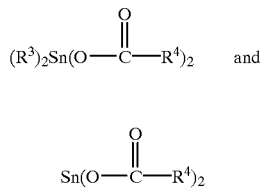

where $R^3$ and $R^4$ are independently selected from the group consisting of alkyls having from 1 to 20 carbon atoms, alkenyls having from 1 to 20 carbon atoms and aryls and alkaryls having from 6 to 20 carbon atoms. A representative example of a tin compound of Formula II is dibutyl tin dilaurate. Representative examples of tin compounds of Formula III include stannous octoate, stannous oleate, stannous laurate and stannous naphthenoate. One preferred isomeric form of stannous octoate is stannous 2-ethyl hexanoate.

The tin organoacid salt compound may be present in a variety of levels. Generally speaking, the tin organoacid salt compound is present in an amount ranging from about 0.1 to 10 phr. Preferably, the stannous compound is present in an amount ranging from 0.5 to 5 phr. In accordance with one embodiment, the amount of the tin organoacid salt compound will range from 0.001 to 0.2 parts by weight per part by weight of the silica. Preferably, the amount will range from 0.005 to 0.1 parts by weight per part by weight of the silica.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.0 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the Vanderbilt Rubber Handbook (1978), pages 344–346. Typical amounts of antiozonants comprise about 1 to 5 phr. Typical amounts of fatty acids, if used, which can include stearic acid, comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in an amount ranging from about 0.05 to about 4 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber, silica, siloxy compound of Formula I and tin organoacid salt compound are mixed in one or more non-productive mix stages. The terms "non-productive" and "productive" mix stages are well known to those having skill in the rubber mixing art. The sulfur vulcanizable rubber composition containing the tin organoacid salt compound, vulcanizable rubber and at least part of the silica should, as well as the sulfur-containing organosilicon compound, be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

In further accordance with the invention, the process comprises the additional step of vulcanizing the prepared rubber composition at a temperature in a range of about 140° C. to about 190° C.

Accordingly, the invention also thereby contemplates a vulcanized rubber composition prepared by such process.

In additional accordance with the invention, the process comprises the additional steps of preparing an assembly of a tire or sulfur-vulcanizable rubber with a tread comprised of the said rubber composition prepared according to the process of this invention and vulcanizing the assembly at a temperature in a range of about 140° C. to about 190° C.

Accordingly, the invention also thereby contemplates a vulcanized tire prepared by such process.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

EXAMPLE I

Table I below shows the basic rubber compound that was used in the six samples in this example. Rubber stocks were prepared in order to compare the effects of using the tin organoacid salt compound in the silica-rich SBR compound versus a control silica-rich SBR compound not containing such tin organoacid salt compound.

The compounding procedures for the nonproductive mixes involved mixing to a maximum batch temperature of 160° C. followed by continued mixing at 160° C. for from 1 (short) to 3 (medium) to 5 (long) minutes. Total mixing times for the nonproductive stages are shown in Table II. All productive stage mixing was for 2 minutes to a maximum batch temperature of less than or equal to 115° C. The compounded physical data for each sample is also in Table II.

TABLE I

| Sample | Ctrl 1 | Ctrl 2 | Ctrl 3 | 4 | 5 | 6 |
| --- | --- | --- | --- | --- | --- | --- |
| Nonproductive | | | | | | |
| E-SBR[1] | 100 | 100 | 100 | 100 | 100 | 100 |
| Si69[2] | 11.0 | 11.0 | 11.0 | 11.0 | 11.0 | 11.0 |
| Aromatic Oil | 21.0 | 21.0 | 21.0 | 21.0 | 21.0 | 21.0 |
| Wax | 1.5 | 1.5 | 1.5 | 1.5 | 1.5 | 1.5 |
| Stearic Acid | 3 | 3 | 3 | 3 | 3 | 3 |
| Stannous Octoate[3] | 0 | 0 | 0 | 2 | 2 | 2 |
| Silica[4] | 70 | 70 | 70 | 70 | 70 | 70 |
| Productive | | | | | | |
| N-cyclohexyl-2-benzothiazole sulfenamide | 1.7 | 1.7 | 1.7 | 1.7 | 1.7 | 1.7 |
| Diphenylguanidine | 2.0 | 2.0 | 2.0 | 2.0 | 2.0 | 2.0 |
| Sulfur | 1.4 | 1.4 | 1.4 | 1.4 | 1.4 | 1.4 |
| Zinc Oxide | 2.5 | 2.5 | 2.5 | 2.5 | 2.5 | 2.5 |
| Diarylparaphenylene diamine | 1.0 | 1.0 | 1.0 | 1.0 | 1.0 | 1.0 |

[1]Emulsion polymerized styrene-butadiene rubber having 23.5 percent by weight bound styrene.

TABLE I-continued

| Sample | Ctrl 1 | Ctrl 2 | Ctrl 3 | 4 | 5 | 6 |
| --- | --- | --- | --- | --- | --- | --- |

[2]A composition of bis-(3-triethoxysilylpropyl) tetrasulfide and N330 carbon black (50/50 weight ratio and, thus, considered as being 50 percent active) commercially available as X50S from Degussa Ag.
[3]Tin (II) 2-ethyl hexanoate used as obtained from Sigma Chemical Company.
[4]A silica obtained as Zeosil ™ 1165MP from Rhodia Inc and, reportably, having a BET surface area of about 165 and a DBP absorption value of about 260–280.

TABLE II

| Sample | Ctrl 1 | Ctrl 2 | Ctrl 3 | 4 | 5 | 6 |
| --- | --- | --- | --- | --- | --- | --- |
| Stannous Octoate (phr) | 0 | 0 | 0 | 2 | 2 | 2 |
| NP total Mix Time (min) | 3½ | 5½ | 7½ | 3½ | 5½ | 7½ |
| NP Mix Time at 160° C. (min) | 1 | 3 | 5 | 1 | 3 | 5 |
| Prod Mix time (min) | 2 | 2 | 2 | 2 | 2 | 2 |
| Rheometer, 160° C. T$_{90}$, min | 7.4 | 7.6 | 7.5 | 5.5 | 5.6 | 5.6 |
| Stress Strain - 30'/160° C. | | | | | | |
| 100% Modulus, MPa | 2.65 | 2.53 | 2.55 | 2.60 | 2.47 | 2.50 |
| 300% Modulus, MPa | 12.32 | 13.15 | 13.19 | 13.30 | 13.74 | 14.51 |
| M300/M100 | 4.65 | 5.20 | 5.17 | 5.12 | 5.56 | 5.80 |
| Brk Str, MPa | 21.3 | 23.0 | 22.1 | 21.7 | 21.5 | 23.5 |
| EL-Brk (%) | 466 | 467 | 449 | 444 | 425 | 439 |
| Rebound - 30'/160° C. | | | | | | |
| RT | 39 | 41 | 42 | 40 | 43 | 45 |
| 100° C. | 57 | 59 | 60 | 61 | 61 | 62 |
| Rubber Process Analyzer at 100° C. | | | | | | |
| Cured G', kPa | 4590 | 3645 | 3262 | 3262 | 2561 | 2200 |
| Ratio G' 50%/1% | 0.272 | 0.334 | 0.369 | 0.353 | 0.428 | 0.475 |
| Tan Delta 10% | 0.170 | 0.148 | 0.145 | 0.151 | 0.134 | 0.127 |
| DIN abrasion, rel at loss | 100 | 97 | 95 | 88 | 88 | 84 |

Control compound 1 reveals the baseline level of performance of this silica-filled rubber composition, and control compounds 2 and 3 show the benefits which derive from extra thermomechanical mixing of the non-productive stage.

Thus, comparing the cured physical properties as NP stage mixing time is increased (compound 1 to 2 to 3):
  300% Modulus and M300/M100 ratio increase
  RT and 100° C. rebound increase
  DIN abrasion weight loss decreases
  cured low strain dynamic modulus G'@1% decreases, but the ratio of G'50%/G'1% increases
  tangent delta at 100° C. decreases These are favorable trends in physical properties which support improved reinforcement and reduced abrasion and hysteresis.

Now, when comparing the experimental compounds 4, 5 and 6 which contain 2 phr stannous octoate additive to the NP mix stage, one can see that, at a given mix time (ie, 1 versus 4, 2 versus 5 or 3 versus 6), the composition with the stannous octoate has much improved physical properties relative to the control:
  higher 300 percent Modulus and M300/M100
  higher RT and 100° C. rebound
  lower cured low strain modulus G'@1%
  higher ratio of G'50%/G'1%
  lower tangent delta at 100° C.
  lower abrasion weight loss For example, at the long NP mix condition of 5 min at 160° C. with a total NP mix time of 7½ minutes, experimental compound 6 with 2 phr stannous octoate, provides improved physical properties versus control compound 3 including:

|  | 6 | 3 |
|---|---|---|
| 300% Modulus | 14.51 | 13.19 |
| M300/M100 | 5.80 | 5.17 |
| RT rebound | 45 | 42 |
| 100° C. rebound | 62 | 60 |
| tan delta 100° C. | 0.127 | 0.145 |
| abrasion wt loss | 84 | 95 |

So, addition of a tin organoacid salt compound to a silica-filled rubber composition results in improved performance at a given mix time.

Additionally, the composition 5 containing a tin organoacid salt compound and mixed to a medium NP mix condition of 3 minutes at 160° C. with a total NP mix time of 5½ minutes provides improved performance relative to the control compound as mixed to the same conditions (compound 2) and even improved performance relative to the control compound mixed to a longer NP mix time (compound 3):

|  | 5 | 13 |
|---|---|---|
| 300% Modulus | 13.74 | 13.19 |
| M300/M100 | 5.56 | 5.17 |
| RT rebound | 43 | 42 |
| 100° C. rebound | 61 | 60 |
| tan delta 100° C. | 0.134 | 0.145 |
| abrasion wt loss | 88 | 95 |

So, addition of a tin organoacid salt compound to silica-filled rubber composition results in simultaneously both improved performance and ability to reduce expensive processing time.

Reducing processing (mixing) time in the control compound is only achieved at a sacrifice in performance (compound 2 versus 3).

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprising (a) 100 parts by weight of an elastomer containing olefinic unsaturation selected from the group consisting of conjugated diene homopolymers and copolymers and from copolymers of at least one conjugated diene and aromatic vinyl compound;

(b) from 10 to 150 phr of a silica;
(c) from 0.1 to 15 phr of a sulfur containing organosilicon compound of the formula

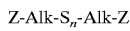

in which Z is selected from the group consisting of

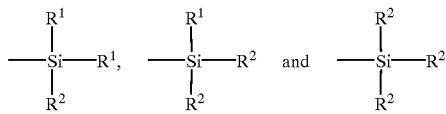

where $R^1$ is an alkyl group of 1 to 4 carbon atoms, cyclohexyl or phenyl;
$R^2$ is alkoxy of 1 to 8 carbon atoms, or cycloalkoxy of 5 to 8 carbon atoms;
Alk is a divalent hydrocarbon of 1 to 18 carbon atoms and n is an integer of 2 to 8; and
(d) from 0.1 to 10 phr of a tin organoacid salt selected from the group consisting of compounds of the formula (II)

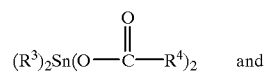

and (III)

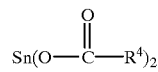

where $R^3$ and $R^4$ are independently selected from the group consisting of alkyls having from 1 to 20 carbon atoms, alkenyls having from 1 to 20 carbon atoms and aryls and alkaryls having from 6 to 20 carbon atoms.

2. The rubber composition of claim 1 wherein said elastomer containing olefinic unsaturation is selected from the group consisting of natural rubber, neoprene, polyisoprene, butyl rubber, polybutadiene, styrene-butadiene copolymer, isoprene-butadiene rubber, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

3. The rubber composition of claim 1 wherein the tin organoacid salt is of Formula II.

4. The rubber composition of claim 3 wherein the tin organoacid salt is dibutyl tin dilaurate.

5. The rubber composition of claim 1 wherein the tin organoacid salt is of Formula III.

6. The rubber composition of claim 5 wherein the tin organoacid salt is selected from the group consisting of stannous octoate, stannous oleate, stannous laurate and stannous naphthenoate.

7. The rubber composition of claim 6 wherein the tin organoacid salt is stannous octoate in the isomeric form of tin (II) 2-ethyl hexanoate.

8. The rubber composition of claim 1 wherein the amount of silica ranges from 15 to 100 phr.

9. The rubber composition of claim 1 wherein the amount of sulfur containing organosilicon compound ranges from 1.0 to 10 phr.

10. The rubber composition of claim 1 wherein said silica rubber composition is thermomechanically mixed at a rubber temperature in a range of from 140° C. to 190° C. for a mixing time of from 1 to 20 minutes.

11. The rubber composition of claim 2 wherein said elastomer is styrene-butadiene rubber.

12. The rubber composition of claim 1 wherein $R^2$ is an alkoxy group of two carbon atoms and n is 4.

13. The rubber composition of claim 1 wherein $R^2$ is an alkoxy group of two carbon atoms and n is 2.

14. A method of processing a rubber composition which comprises mixing (a) 100 parts by weight of an elastomer containing olefinic unsaturation selected from the group consisting of conjugated diene homopolymers and copolymers and from copolymers of at least one conjugated diene and aromatic vinyl compound;

(b) from 10 to 150 phr of a silica;

(c) from 0.1 to 15 phr of a sulfur containing organosilicon compound of the formula

in which Z is selected from the group consisting of

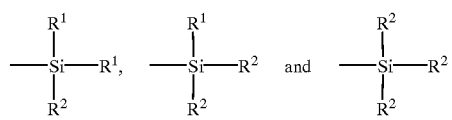

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8; and (d) from 0.1 to 10 phr of a tin organoacid salt selected from the group consisting of compounds of the formula (II)

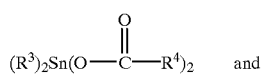 and (III)

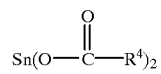

where $R^3$ and $R^4$ are independently selected from the group consisting of alkyls having from 1 to 20 carbon atoms, alkenyls having from 1 to 20 carbon atoms and aryls and alkaryls having from 6 to 20 carbon atoms.

15. The method of claim 14 wherein said elastomer containing olefinic unsaturation is selected from the group consisting of natural rubber, neoprene, polyisoprene, butyl rubber, polybutadiene, styrene-butadiene copolymer, isoprene-butadiene rubber, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

16. The method of claim 14 wherein the tin organoacid salt is of Formula II.

17. The method of claim 16 wherein the tin organoacid salt is dibutyl tin dilaurate.

18. The method of claim 14 wherein the tin organoacid salt is of Formula III.

19. The method of claim 18 wherein the tin organoacid salt is selected from the group consisting of stannous octoate, stannous oleate, stannous laurate and stannous naphthenoate.

20. The method of claim 19 wherein the tin organoacid salt is stannous octoate in the isomeric form of Tin (II) 2-ethyl hexanoate.

21. The method of claim 14 wherein the amount of silica ranges from 15 to 100 phr.

22. The method of claim 14 wherein the amount of sulfur containing organosilicon compound ranges from 1.0 to 10 phr.

23. The method of claim 14 wherein said silica rubber composition is thermomechanically mixed at a rubber temperature in a range of from 140° C. to 190° C. for a mixing time of from 1 to 20 minutes.

24. The method of claim 23 wherein said elastomer is styrene-butadiene rubber.

25. The method of claim 14 wherein $R^2$ is an alkoxy group of two carbon atoms and n is 4.

26. The method of claim 14 wherein $R^2$ is an alkoxy group of two carbon atoms and n is 2.

* * * * *